United States Patent [19]
Geusic

[11] 3,786,452
[45] Jan. 15, 1974

[54] SINGLE WALL DOMAIN GENERATOR

[75] Inventor: John Edward Geusic, Berkeley Heights, N.J.

[73] Assignee: Bell Telephone Laboratories, Incorporated, Murray Hill, N.J.

[22] Filed: Sept. 28, 1972

[21] Appl. No.: 292,874

[52] U.S. Cl. 340/174 TF, 340/174 SC, 340/174 YC
[51] Int. Cl. .......... G11c 11/14
[58] Field of Search .......... 340/174 TF, 174 YC; 346/74 MT

[56] References Cited

UNITED STATES PATENTS 3,676,867 7/1972 Bacon et al. .......... 340/174 YC
3,624,622 11/1971 Di Chen .......... 340/174 YC

OTHER PUBLICATIONS

IBM Technical Disclosure Bulletin Vol. 13, No. 7, Dec. 1970, Pg. 1788–1790

*Primary Examiner*—James W. Moffitt
*Attorney*—H. M. Shapiro

[57] ABSTRACT

The number of magnetic bubbles generated thermally by a pulsed laser beam has been found to be a function of the diameter of the beam leading to a useful bubble generator.

5 Claims, 10 Drawing Figures

SINGLE WALL DOMAIN GENERATOR

FIELD OF THE INVENTION

This invention relates to information storage apparatus and, more particularly, to such apparatus in which information is represented as patterns of single wall domains.

BACKGROUND OF THE INVENTION

P. I. Bonyhard et al. U.S. Pat. No. 3,618,054, issued Nov. 2, 1971, discloses a single wall domain memory in which domain patterns are moved in a layer of material in response to changing pole patterns generated in an arrangement of magnetic elements adjacent a surface of the layer. The pole patterns change in a manner depending on the geometry of the elements responsive to a magnetic field reorienting in the plane of the layer. For a magnetic field rotating (or pulsed in consecutively offset radial orientations), a familiar pattern for the magnetic elements comprises T- and bar-shaped elements of magnetically soft permalloy in a periodic arrangement which defines the stages of the channel. A typical relationship between the element dimensions and a domain moved along the channel during operation is determined by the fact that a stage is typically equal to three or four domain diameters in order to prevent interactions between domains in adjacent stages.

Materials are available which exhibit domains one-tenth of a micron in diameter. But presently available photolithographic techniques are unable to provide T-bar shaped patterns reproducibly with periods on the order of four-tenths micron. Consequently, domains of such small dimensions, at present, cannot be moved with such patterns.

Techniques are known in which double layered domain films are employed with characteristics such that domains with small dimensions exist in one layer whereas domains with large dimensions exist in the other. The term "large dimensions" characterizes a domain with a diameter one-third to one-fourth (viz., a few microns) the dimensions of the period of presently producible magnetically soft (propagation) patterns for effecting domain propagation. The propagation pattern couples the larger domains for movement in the layer. The larger domains, in turn, couple the domains of smaller dimensions in the adjacent layer to shepherd the smaller domains in groups along the channel.

BRIEF DESCRIPTION OF THE INVENTION

The present invention is directed at a novel arrangement for producing groups of domains useful, for example, for shepherding by larger domains. The arrangement is based on the discovery that the number of domains generated in a localized region of a domain layer is a function of the diameter of a laser beam directed at that region. Therefore, in accordance with one aspect of this invention, laser generating apparatus selectively directs a laser beam at a domain layer through a means such as a lens for changing the diameter of the beam. Groups of domains are formed, the number of domains in the group depending on the beam diameter and beam energy; the positions of the domains depending on the mutual repulsion forces which exist between domains.

DETAILED DESCRIPTION

Figure 1:
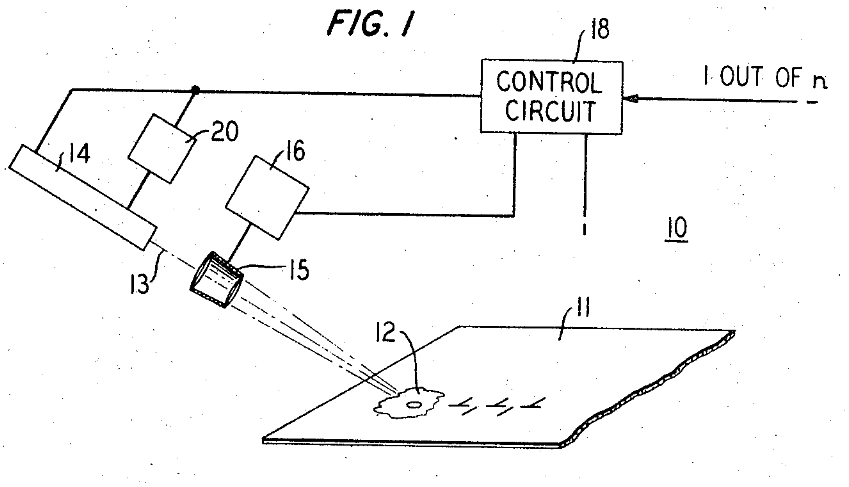
FIG. 1 is a schematic illustration of an arrangement in accordance with this invention.

FIG. 1 shows a single wall domain input arrangement 10 in accordance with this invention. The arrangement comprises a layer 11 of material in which single wall domains can be moved. Such domains for movement in layer 11 are generated in an input region 12 indicated in FIG. 1.

A source of a laser beam 13 is represented by block 14 in FIG. 1. Beam 13 is directed through a lens system 15 at the surface of layer 11. The lenses are in the path of beam 13 and illustratively are adapted for displacement along the axis of beam 13 by apparatus represented by block 16 in FIG. 1 for changing the diameter of the beam which impinges on the surface of layer 11. Laser 14 and apparatus 16 are controlled by a control circuit represented by block 18 of FIG. 1.

Figure 2:
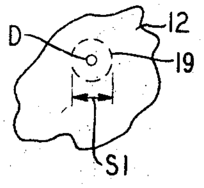
FIGS. 2 through 10 are schematic top views of a portion of the arrangement of FIG. 1 during operation.
Figure 3:
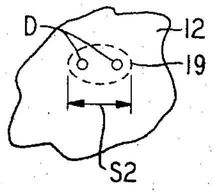

FIGS. 2 through 10 show a top view of the surface of region 12 of FIG. 1. A single wall domain in the region is represented by a solid circle D; the beam diameter by broken circle 19. It has been found that the number of domains generated by a laser beam depends on the diameter of that beam. Consequently, a beam of diameter S1, as shown in FIG. 2, generates one domain; whereas a beam of diameter S2 greater than S1 generates two domains as shown in FIG. 3.

Figure 4:
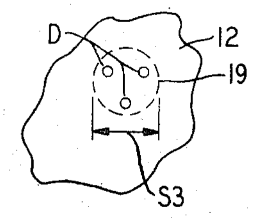
Figure 5:
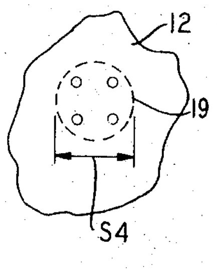
Figure 6:
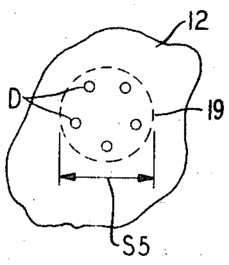
Figure 7:
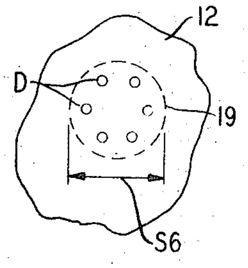
Figure 8:
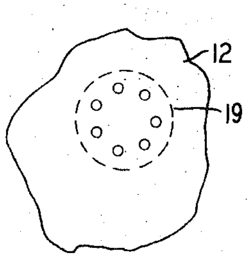
Figure 9:
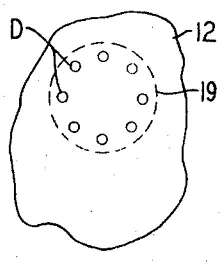
Figure 10:
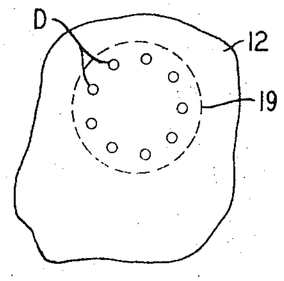

Larger beam diameters correspond to greater numbers of domains. FIGS. 4 and 5, for example, show beam diameters of S3 and S4 corresponding to three and four domains, respectively. FIGS. 6 and 7 show five and six domains corresponding to diameters S5 and S6. Even larger diameters correspond to seven, eight, and nine domains as illustrated in FIGS. 8 through 10.

The dispositions of the domains in the figures are determined by the repulsion forces between domains. The dispositions shown are those occupied by like particles which repel one another as is known in the art. It is also known that alternative dispositions (for those particles) are possible. However, the most common dispositions produced by laser thermal generation are shown.

The fact that the number of domains so generated is a function of a laser beam diameter is established by the following theory as well as by experiment:

Assume that a laser "heat pulse" impinges a circular surface area, of layer 11, having a diameter $S_i$ and that the laser energy is delivered in a short time compared with the thermal conduction time characteristic of the material of layer. Under such an assumption, we can consider that the circular area is heated to a given temperature and that the surrounding material remains at ambient for a time period of the order of the thermal time constant.

Assume also a normal history for layer 11 in which it is exposed first to a bias field well above the collapse value and second to a bias field within the stable bubble bias range. No domain exists in the material under these conditions. In this context, consider the case where (1) the laser beam is of sufficient energy to raise material of layer 11 in the preselected area to the Curie temperature, (2) the bias field is held at the center of the stable bias range, and (3) the operating diameter of a domain under these conditions is $r_o$. In order for the beam to generate a single domain (or bubble), $S>r_o$.

The maximum value of $S_i$ for generating a single bubble is determined by the critical diameter $S_c$ in which two bubbles interact to collapse one another. If the center-to-center spacing of two bubbles of radius $r_o$ is designated $L_{ab}$, then that critical diameter is defined by equation (1):

$$S_c = L_{ab} + 2r_o \qquad (1)$$

The repulsive force $\Delta H$ of one bubble on its neighbor is defined by equation (2):

$$\Delta H = 2M_s \pi r_o^2\ h/L_{ab}^3 \qquad (2)$$

where $M_s$ is the saturation magnetization of layer 11 and $h$ is the thickness of the domain layer. This repulsion force adds to the external bias field and tends to collapse its neighbor. If $h$ is assumed to be equal to $2r_o$, then for $\Delta H = 0.05\ (4\pi M_s)$, two neighboring bubbles tend to collapse one another, and equations (1) and (2) determine the diameter at which collapse occurs. From (1) then $$S_c = 2.7r_o + 2r_o = 4.7r_o \qquad (3)$$

Therefore, within the diameter range of $r_o$ to 4.7 $r_o$ only a single bubble can be nucleated thermally.

Similarly, it can be shown that there exists diameter ranges over which different numbers of bubbles can be generated thermally by laser Curie point writing. The following chart shows the diameter ranges for 1 through 7 bubbles where the interactions of more than two bubbles have been considered in each instance except for the first.

| Range of Diameters For Heated Region | Number of Bubbles Generated |
|---|---|
| $r_o$ to $<4.7r_o$ | 1 |
| $>4.7r_o$ to $<6r_o$ | 2 |
| $>6r_o$ to $<7.1r_o$ | 3 |
| $>7.1r_o$ to $<8.2r_o$ | 4 |
| $>8.2r_o$ to $<9.4r_o$ | 5 |
| $>9.4r_o$ to $<10.6r_o$ | 6 |
| $>10.6r_o$ to $<11.1r_o$ | 7 |

The bubbles tend to occupy positions about the periphery of the heated area, central positions being occupied only when no further positions at the periphery are available. This can be seen from FIGS. 7, 8, 9, and 10 particularly.

In one example, a laser beam of energy $5 \times 10^{-8}$ to $5 \times 10^{-7}$ joules and a duration of $10^{-7}$ sec. supplied by doubled YAG laser, wavelength 5328 A, directed at a surface of an epitaxially grown film of $YEu_2\,Fe_4\,Al_1\,O_{12}$ on $Gd_3\,Ga_5\,O_{15}$. The film exhibited bubbles over a bias field range of 100–115 Oe and had bubbles with operating diameters of 6 microns. The material had a Curie temperature of 127°C. The beam diameter at the film surface was controlled by adjusting the position of a focusing lens. For a heated area with a diameter of 6 microns, and with an energy of $5 \times 10^{-8}$ joules, one bubble was generated. For heated areas of 15 microns, 19 microns, and 23 microns, and, respectively, energies of $3 \times 10^{-7}$ joules, $5 \times 10^{-7}$ joules, and $7 \times 10^{-7}$ joules, two, three, and four bubbles were generated.

Implicit in the foregoing explanation is the assumption that sufficient heat energy be delivered to change the temperature of the heated area to the Curie temperature. Since the amount of energy required increases with the square of the diameter of the heated area, the energy employed for an area of $2r_o$ diameter is four times that employed for an area of $r_o$ diameter. An area with a diameter of $4r_o$ utilizes about sixteen times as much energy, and so on. Consequently, control circuit 18 is operative to vary the energy of laser 14 conveniently by means of a modulator represented by block 20 of FIG. 1 responsive to one-out-of-$n$ input signals.

The exact amount of heat energy necessary in each instance is measured by that required to reduce the magnetization of the heated area to almost zero. This is accomplished in the illustrative example by heating the area to the Curie temperature. But bubble materials are characterized by compensation points and some are characterized by spin flop temperatures. The magnetization of the heated regions tends to zero when any of these temperatures are reached. Moreover, the magnetization may not actually have to reach zero for domains to be nucleated in accordance with this invention because of the effect of wall energy in the relationship which determines domain nucleation. This relationship is not fully understood at this time.

In double layer embodiments where a relatively large diameter bubble is moved in one layer in a manner to shepherd relatively small bubbles in an adjacent layer, there is little trouble in registering the bubbles in the two layers. Typically, the larger bubbles are generated first in a top layer and provided by familiar bubble generation means. The smaller bubbles are generated by exposure to say a pulsed laser beam through the nonmagnetic substrate on which the bubble layers are formed. Not only is the "small bubble" layer highly absorbing of the heat energy, but the larger bubbles are typically 10 times the diameter of the smaller bubbles and the heated area accordingly is so small that the laser beam affects the larger bubbles only negligibly.

What has been described is considered merely illustrative of the principles of this invention. Therefore, various modifications can be devised by those skilled in the art in accordance with those principles within the spirit and scope of this invention as encompassed by the following claims.

What is claimed is:

1. Apparatus comprising a layer of material in which single wall domains can be moved, and means for generating single wall domains at a localized input position in said layer, said last-mentioned means comprising means for applying to said input position heat energy for a time to heat said position to a first temperature at which the magnetization at said position is at about zero, and means responsive to external signals for changing the size of the heated area of said position in a manner for selectively generating different numbers of said domains there.

2. Apparatus in accordance with claim 1 wherein said layer is characterized by a Curie temperature and said first temperature is said Curie temperature.

3. Apparatus in accordance with claim 1 wherein said means for applying heat energy comprises a source of a pulsed laser beam and said means responsive to external signals comprises means for changing the diameter of said beam.

4. Apparatus in accordance with claim 3 also including means responsive to said external signals for changing the energy of said beam.

5. Apparatus comprising a layer of material in which single wall domains can exist, and means for generating single wall domains at a localized input position in said layer, said last-mentioned means comprising means for directing a pulsed laser beam at said input position, and means responsive to one-out-of-$n$ external signals for changing the diameter of said beam to a selected one of $n$ values in a manner to produce different numbers of said domains at said position.

* * * * *